United States Patent Office.

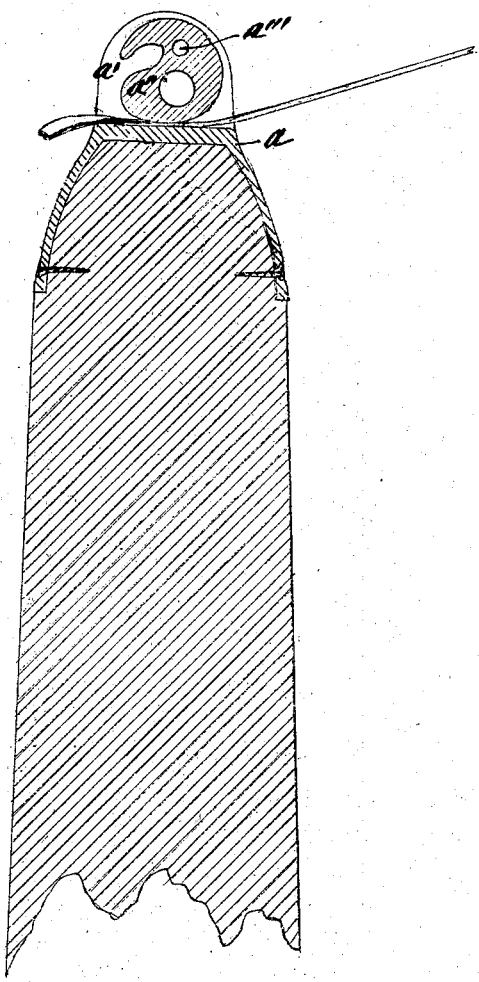

RICHARD N. ROBERTS, OF NEW BRITAIN, CONNECTICUT

Letters Patent No. 74,596, dated February 18, 1868.

IMPROVEMENT IN HITCHING-POST CAP.

The Schedule referred to in these Letters Patent and making part of the same.

TO ALL WHOM IT MAY CONCERN:

Be it known that I, RICHARD N. ROBERTS, of New Britain, county of Hartford, and State of Connecticut, have invented certain new and useful Improvements in Caps for Hitching-Posts; and to enable others skilled in the art to make and use the same, I will proceed to describe, by referring to the drawings, in which the same letters indicate like parts in each of the figures.

The nature of this invention consists in providing a metallic cap for a hitching-post, to protect the post from checking from the exposure to the weather, and in combining therewith a fastening-device, whereby a hitching-line or strap can be easily and quickly inserted, and held by compression, when pulled upon in one direction, and readily loose its hold, and allow the line or strap to be withdrawn, when desirable.

In the accompanying drawings are shown sectional elevations of this improvement in hitching-post caps.

$a$ is the cap, which is designed to be fitted to the upper end of a hitching-post, the design or style of which may be varied to suit the taste. Upon the upper end of this cap are provided ears or bosses, $a'$. $a''$ is a strap-holder, secured between the bosses $a'$ by means of a fulcrum-pin, $a'''$, which passes through the strap-holder $a''$ and the ears or bosses $a'$. The strap-holder may be made more or less eccentric, as desirable, by placing the line or strap between the cap and eccentric, from one side. The fastener will compress the strap, and hold it secure, until relieved by pulling upon the other side or end of the strap.

By the use of this invention, the reckless practice of leaving teams unhitched may be avoided, thus producing a cheap, simple, and durable article for use and trade.

I believe I have thus shown the nature, construction, and advantage of this invention, so as to enable others skilled in the art to make and use the same therefrom.

What I claim, therefore, and desire to secure by Letters Patent, is—

An improved article of manufacture, viz, a metallic hitching-post cap, in combination with a cam strap-holder, constructed and arranged substantially as described.

RICHARD N. ROBERTS. [L. S.]

Witnesses:
E. W. BLISS,
JEREMY W. BLISS.